No. 786,845. PATENTED APR. 11, 1905.
F. W. SCHROEDER.
VARIABLE SPEED GEAR.
APPLICATION FILED OCT. 13, 1903.
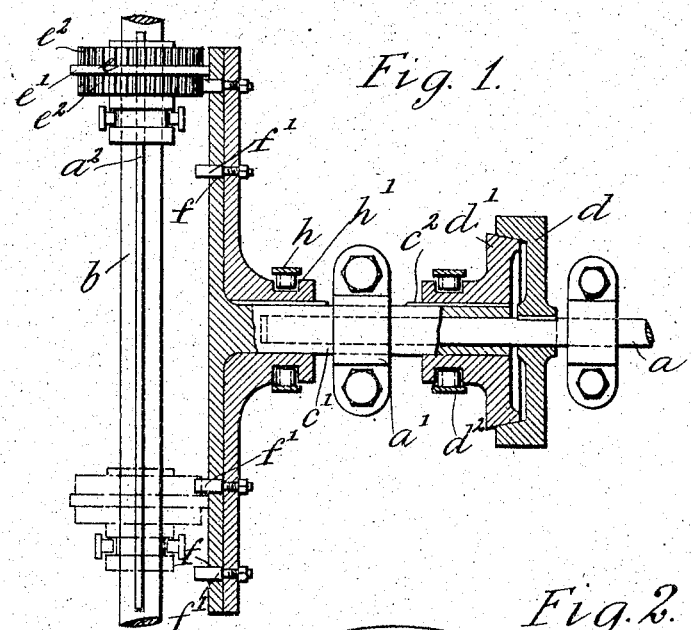
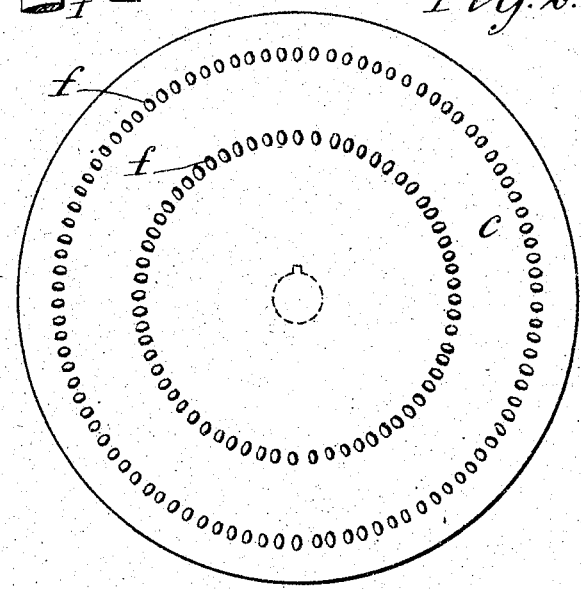

No. 786,845.

Patented April 11, 1905.

UNITED STATES PATENT OFFICE.

FREDERICK WILLIAM SCHROEDER, OF LONDON, ENGLAND.

VARIABLE-SPEED GEAR.

SPECIFICATION forming part of Letters Patent No. 786,845, dated April 11, 1905.

Application filed October 13, 1903. Serial No. 176,869.

*To all whom it may concern:*

Be it known that I, FREDERICK WILLIAM SCHROEDER, a subject of the King of Great Britain and Ireland, residing at 9 Arundel street, Strand, London, England, have invented certain new and useful Improvements in Variable-Speed Gear, of which the following is a specification.

Driving mechanism has been used in which a friction-wheel keyed on a counter-shaft and capable of sliding thereon has been driven by a disk operated by the motor, so that as the friction-wheel is moved toward the center of such disk the counter-shaft is caused to rotate slower and as it is moved outward it is caused to rotate quicker. This method of driving has been found to be disadvantageous, owing to the rolling friction becoming deficient.

This invention relates to improvements in and relating to friction-gearing of this character by which such disadvantage is overcome and which is especially applicable to driving mechanism.

In the accompanying drawings, Figure 1 is a longitudinal section, partly in elevation, of a two-speed gear constructed according to the present invention; and Fig. 2, an end elevation of the compound driving-disk, showing only some of the teeth.

Assuming that the shaft $a$ is the driving-shaft and the shaft $b$ the one to be driven at variable speed, the driving-shaft is supported in bearings $a'$ and is arranged to be connected to the hollow axle $c'$ of the driving-disk $c$ by means of a clutch, one member of which, $d$, is fixed to the shaft $a$, while the other member, $d'$, is arranged to slide on a feather $c^2$ on the axle of the disk, a forked lever $d^2$ engaging in a groove serving for this purpose.

On the shaft $b$, the axis of which intersects orthogonally the axis of shaft $a$, is mounted a pinion $e$, arranged to slide along the shaft on a feather $a^2$. A projecting smooth band $e'$ on this pinion, preferably faced with leather, engages frictionally with the face of the disk $c$, so that when the latter is driven at a constant speed the speed of the shaft $b$ will depend on the position of the pinion $e$ on the shaft, being a maximum when the pinion gears with the edge of the disk and decreasing as the pinion is shifted toward the center of the disk. When it is shifted to the other side of the center of the disk, the direction of rotation of the shaft $b$ is reversed. In order to overcome the most serious defect of this form of variable-speed gear—namely, the liability to slip between the disk and pinion—the latter has formed round its periphery on each side of the smooth band $e'$ a ring $e^2$ of teeth, the diameter over the teeth being less than the diameter of the smooth band $e'$. The disk $c$ has formed in it two or more rings of holes $f$, preferably elliptical, concentric with its axis and of a pitch equal to that of the teeth on the pinion $e$. Another disk, $g$, formed with a sleeve having a keyway engaging with a feather on the axle $c'$, is provided with two or more rings of teeth $f'$, corresponding in shape and pitch with the holes $f$ in the disk $c$. Each tooth is preferably separately fixed to the disk $g$ by passing its shank through a hole in the disk and securing it with a nut. A forked lever $h$, engaging in a groove $h'$ in the sleeve of the disk, serves to slide the latter on the hollow axle $c'$ and can be secured in two positions, in one of which the elliptical teeth project through the holes $f$, so as to engage with the teeth in the pinion $e$, while in the other the teeth are withdrawn flush with the disk $c$. The teeth may be lubricated by any suitable connections.

The leather facing of the smooth band of the pinion besides increasing the frictional driving also serves to deaden the noise of the gear by damping the vibrations set up in the disk.

When the pinion is in gear with one ring of teeth and it is desired to put it in gear with another ring, the disk $g$ may be drawn backward by means of its operating-lever before disconnecting the clutch $d'$. The pinion $e$ is shifted along its shaft until the gear-teeth $e^2$ are on the outer side of the ring of teeth $f''$ with which they are to be geared. The disk $g$ is thrown forward to bring the teeth $f''$ into the engaging position, and the pinion is then shifted inward to bring the teeth $f''$ into the engaging position, and the pinion is then shifted inward to bring the teeth $e^2$ into gear with the teeth $f'$. When this has been done, the driving-disk is again coupled to the driving-shaft by means of the clutch $d'$.

In order to insure that there can be no gearing up while the driving-shaft is connected to the driving-disk, the forked levers $h$ and $b^2$ may be arranged to interlock in such a way as to prevent this happening.

The pinion $e$ may be caused to slide along its shaft by means of a lever similar to that used for operating the clutch or the disk $g$, or any other suitable arrangement may be employed which enables the pinion to traverse the full diameter of the driving-disk and to be secured in any position along its range. The two rings of teeth on the pinion are arranged to engage with the teeth on the driving-disk, the one when the pinion is on one side of the center of the disk for forward driving and the other when it is on the other side for reverse driving, as shown in dotted lines in Fig. 1, in each case the row of gear-teeth $e^2$ nearer the center of the driving-disk being the operative teeth.

Having thus described the nature of this invention and the best means I know of carrying the same into practical effect, I claim—

1. Driving-gear for two shafts the axes of which intersect orthogonally, comprising a pinion having a friction-band and a ring of teeth and arranged to slide along one of the shafts, a fixed disk having its face in engagement with the friction-band of the pinion, a clutch for connecting the fixed disk to the other shaft, two or more rings of holes in the fixed disk concentric with its axis, the pitch of the holes being the same as that of the pinion-teeth, a second disk coaxial with the first and having rings of teeth which pass through the holes in the first disk and are adapted to engage with the teeth of the pinion, means for withdrawing the teeth on the disk out of gear with the pinion and means for sliding the pinion along its shaft, substantially as described.

2. In speed-gearing, a disk having annular rows of holes, rings of teeth corresponding to the said rows of holes, mechanism for moving said teeth endwise through the holes to the engaging or retracted position, a shaft, means for clutching the disk to the shaft, another shaft crossing the line of the disk-shaft and having a friction-disk with sets of teeth on each side thereof and mechanism for moving the friction-disk endwise of its shaft, one set of teeth being arranged to engage the disk-teeth on one side of the center and the other set arranged to engage the teeth when the friction-disk is on the other side of the center; substantially as described.

3. In speed-gear a disk, a pinion adapted to engage frictionally with the said disk, gear-teeth on the pinion, a second disk, rows of teeth on the second disk adapted to gear with the pinion-teeth, and means for advancing and retracting the second disk, substantially as described.

4. In speed-gearing a friction-disk having an annular series of holes, a second disk having teeth within said holes, mechanism for shifting the second disk to project or retract the teeth, and a friction-wheel arranged to engage the first disk and provided with teeth arranged to engage the movable teeth when in normal position; substantially as described.

In testimony whereof I have signed my name to this specification in the presence of two subscribing witnesses.

FREDERICK WILLIAM SCHROEDER.

Witnesses:
J. MILLARD,
EDWARD GARDNER.